April 2, 1963 H. H. COOK 3,083,417
BOOTH STRUCTURE
Filed May 18, 1959 3 Sheets-Sheet 1
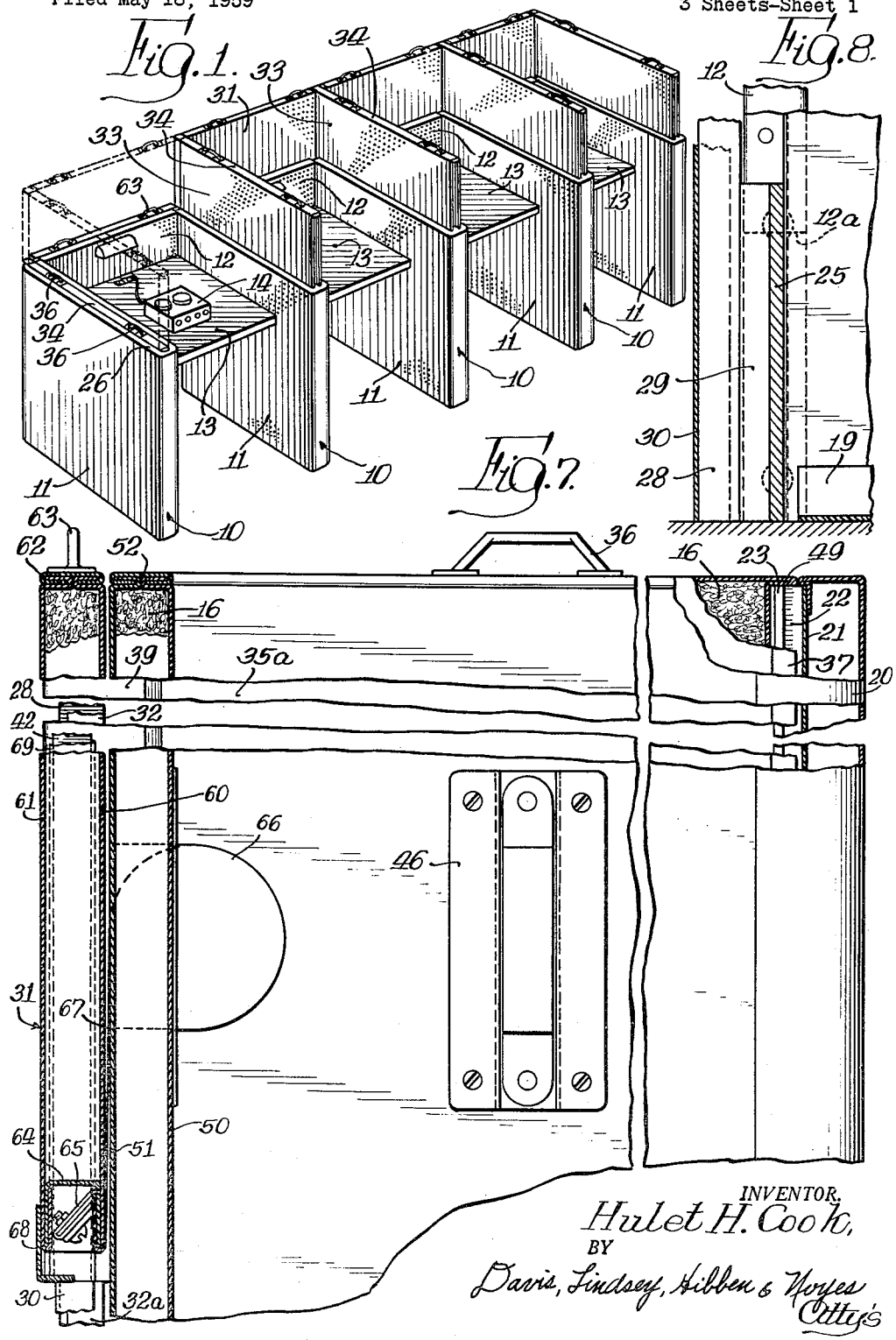
INVENTOR.
Hulet H. Cook,
BY
Davis, Lindsey, Hibben & Noyes
Attys April 2, 1963
H. H. COOK
3,083,417
BOOTH STRUCTURE
Filed May 18, 1959
3 Sheets-Sheet 2
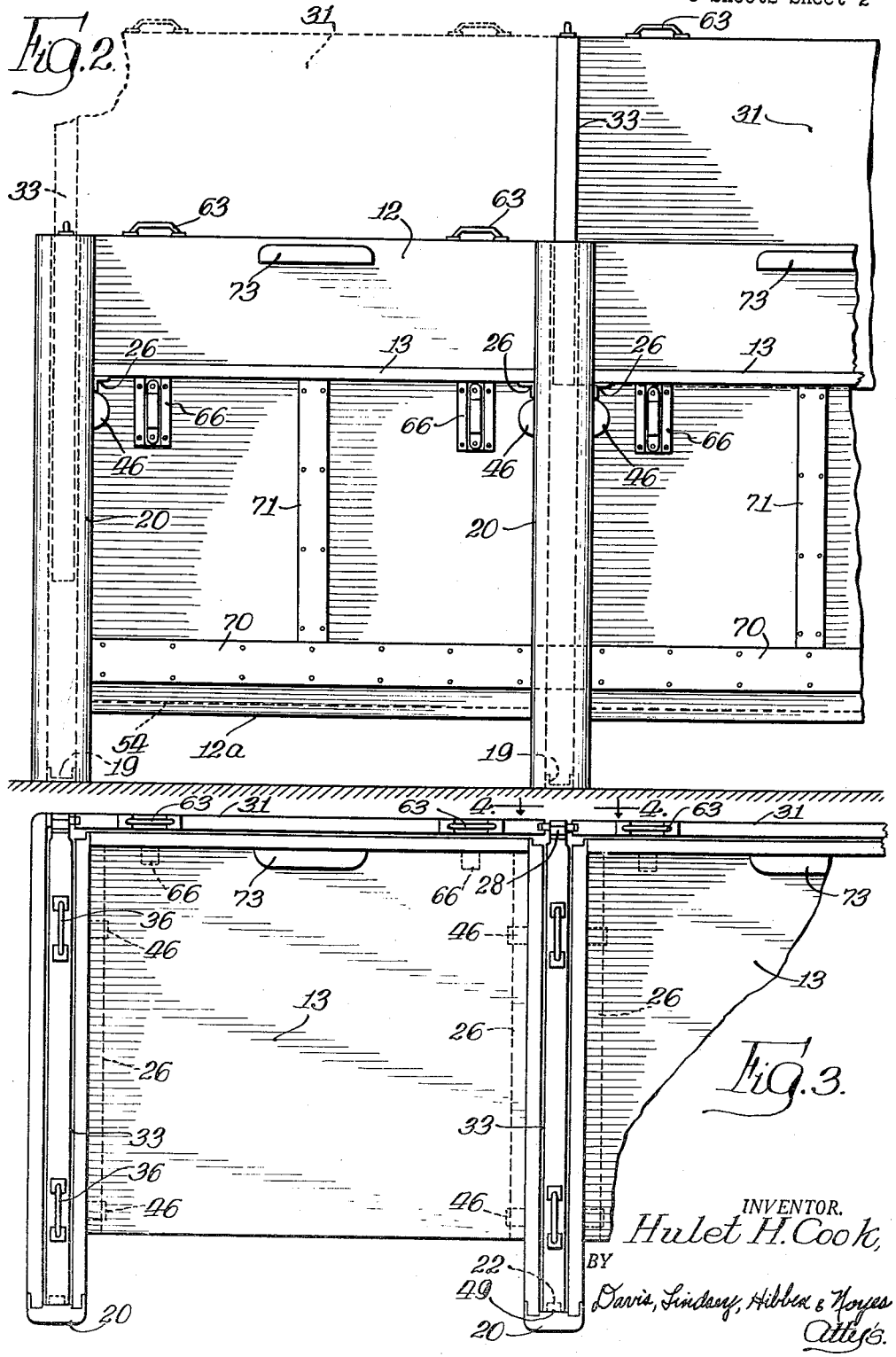
INVENTOR.
Hulet H. Cook,
BY
Davis, Lindsey, Hibben & Noyes
Attys.

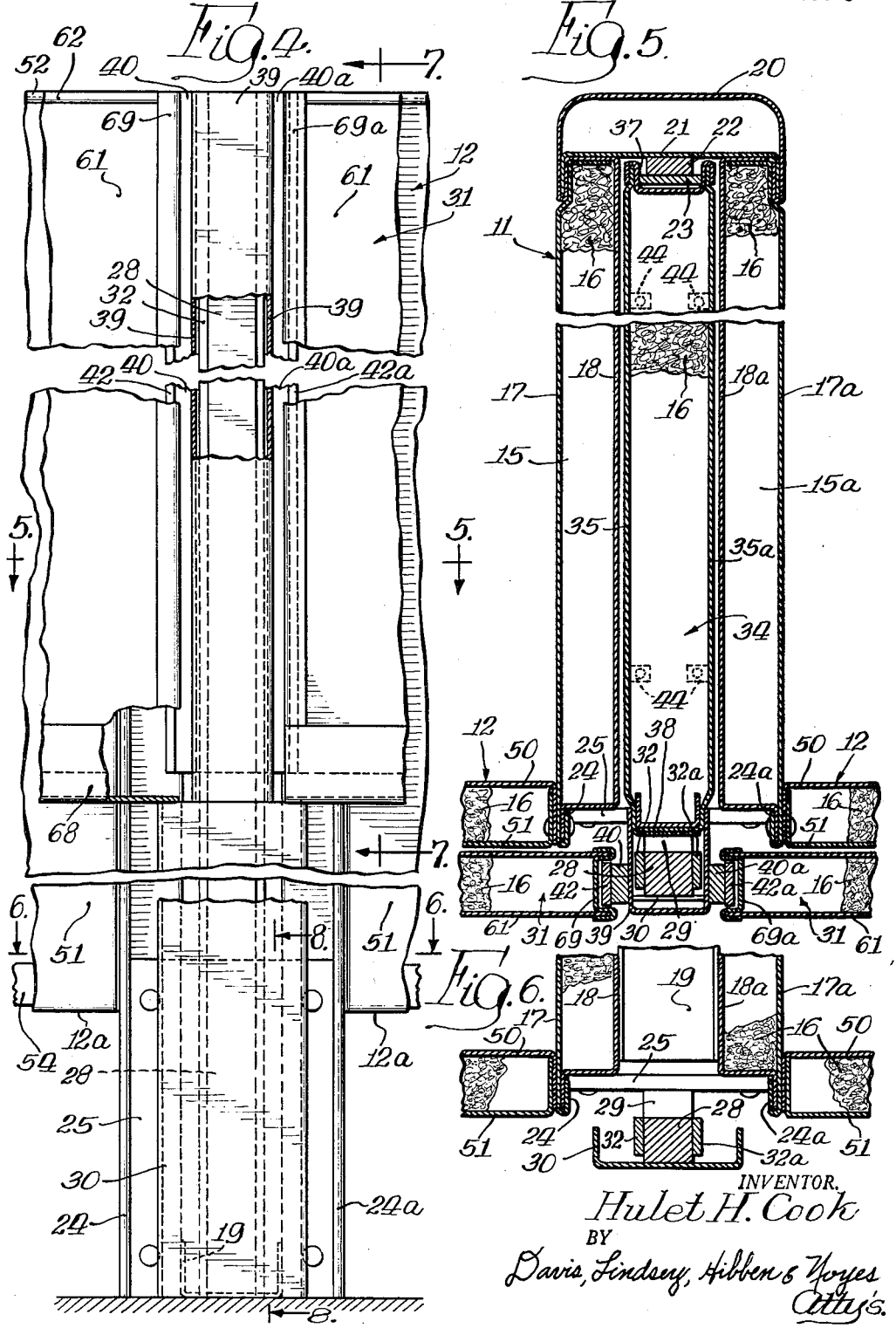

United States Patent Office 3,083,417
Patented Apr. 2, 1963

3,083,417
BOOTH STRUCTURE
Hulet H. Cook, Bloomington, Ind., assignor to Indiana University Foundation, Bloomington, Ind., a corporation of Indiana
Filed May 18, 1959, Ser. No. 813,745
6 Claims. (Cl. 20—.5)

The present invention relates generally to apparatus useful in connection with conducting educational programs, and more particularly, to a booth structure used in connection with the instruction of foreign languages and other studies.

The importance of improving the ability of students in speaking and understanding spoken foreign languages has been more fully appreciated with the recent recognition of the international responsibilities of the United States. With these increased responsibilities there has been an increased need for Americans to communicate directly with many other peoples of the world. Accordingly, much thought and study is being expended in devising installations of mechanical and electronic equipment to facilitate learning foreign languages. These installations are generally designated as language laboratories.

A language laboratory, as heretofore designed, comprises a classroom equipped with a plurality of booths having electronic equipment therein for individual use by a student. Each booth has a desk surface with fixed side partitions extending upwardly above the desk surface and preferably having a front panel which is movable vertically so that the student can, when group instruction is given, lower the front panel.

Each of the language booths is generally equipped with a tape or other type of recording machine and amplifier, a set of high-quality earphones, a microphone, and a plurality of jacks which enable the student to cut into any one of several audio channels. In addition, the room usually has a monitoring panel for the instructor, a motion picture projector and screen, and the usual blackboard space for group instructions.

When a student is working individually in a language booth, he can select a record or tape recording previously made by the instructor, and then listen to the spoken word in the audio isolated booth. The student may then listen to the foreign language which the instructor has placed on the tape and repeat the spoken words to improve his own speaking ability. The student can play back his own recording and compare this with the instructor's recording. The foregoing practice takes place within the sound isolated booth and without interfering with other students within the laboratory.

After each of the students has completed individual practice, the instructor frequently wishes to talk to the class as a group, or provide other visual and audible instructions for the class. Thus, the instructor may wish to show a sound motion picture, have a native of the foreign country speak to the class, or provide other group instructions to impart a foreign atmosphere in the classroom. The latter type of instruction has been found to be an important part of any language laboratory work. And, during any such group instruction period, it is essential that a student seated in the booth have a clear unobstructed view of the front of the classroom.

Heretofore, several booths have been devised for use in language laboratories of the type described. For example, one form of booth has been constructed, having permanent side walls which extend upwardly six or seven feet above the floor, and a permanent front wall which extends from the floor only to a height slightly above the level of the desk surface but below the level of the eyes of a person seated in the booth, and which is provided with a pivotally mounted or vertically reciprocable upper section capable of being raised to the same height as the permanent side walls when individual practice therein is desired, and adapted to be lowered to about desk top level during group instruction periods. When the movable front wall of the latter booth is lowered, the student is able to look forwardly from the booth and participate to a limited extent in group instruction. However, because of the permanent high side walls, these booths must be arranged generally on an arc of a circle, with a consequent loss of floor space, so that all will face directly toward the instructor when group instructions are given in order to enable the students to get an unobstructed view of the front of the classroom. Booths of the foregoing type cannot be placed in straight lines across the room because those in the booths at the side of the room, particularly those in the rear of the room and at the side, could not see the center of the front of the room due to the interference by the permanent side walls of the booths. The permanent side walls also interfere with the audibility at the rear of the room.

In another form of language booth herefore devised, the booth is provided with permanent side walls of a height sufficient to isolate the booth, and is also provided with a fixed front wall of plate glass extending to the same height as the side walls. In the latter booths, students at the sides of the classroom have their view obscured by the permanent side walls, and those at the rear of the language laboratory have to look through several layers of plate glass in order to see the instructor at the front of the room. Moreover, the plate glass partitions are not sufficiently sound-deadening and they also interfere with the students hearing the instructor's spoken words when he directly addresses the class as a group.

It is, therefore, an object of the present invention to provide an improved booth structure for use in an instruction classroom.

It is a further object of the present invention to provide an improved booth structure which permits placing a large number of booths within a classroom without permanently interfering with the visibility or audibility within the classroom.

It is a still further object of the present invention to provide a booth structure which is adapted for individual acoustically isolated usage, and which is also useful for group instruction.

It is another object of the present invention to provide an improved booth structure for a language laboratory suitable for classroom use which can be arranged in straight rows across a classroom to make the maximum use of the floor space without permanently interfering with the visibility within the classroom.

The foregoing objects and other objects of the present invention will be apparent to those skilled in the art from the detailed description and claims to follow when read in conjunction with the accompanying drawings wherein:

FIGURE 1 is a perspective view of a preferred embodiment of the booth structure of the present invention;

FIG. 2 is an enlarged fragmentary rear elevational view of the booth structure of FIGURE 1;

FIG. 3 is a fragmentary plan view of the booth structure of FIGURE 1;

FIG. 4 is a fragmentary front elevational view, partially in vertical section, of the booth structure of FIGURE 1;

FIG. 5 is a fragmentary horizontal sectional view taken along the line 5—5 of FIG. 4;

FIG. 6 is a fragmentary horizontal sectional view taken along the line 6—6 of FIG. 4;

FIG. 7 is a vertical sectional view taken along the line 7—7 of FIG. 4; and

FIG. 8 is a vertical sectional view taken along the line 8—8 of FIG. 4.

The booth structure which is adapted to being supported on a floor is shown generally in FIGURE 1 of the drawing, and more specifically in FIGS. 2–8 of the drawing, and comprises a plurality of individual booths 10 of generally quadrilateral form having at least three sides, each booth 10 having fixed side wall assemblies 11 and a fixed front wall assembly 12 formed of suitable sound-deadening material, with the respective side wall and front wall assemblies having closed connections along their adjacent vertical edges to form a unitary structure. For adjoining booths, only one side wall assembly 11 is provided between them. A generally horizontal desk surface member 13 is disposed within the fixed wall assemblies 11, 12, adjacent the upper end thereof and serves as a support for electronic voice reproducing equipment 14 and as a general work surface. The fixed side wall and front wall assembly extends upwardly a distance slightly above the level of the desk surface and below the level of the eyes of a student seated within the booth so that it provides no obstruction to clear visibility to the student. The lower edge of the fixed front wall assembly 12 is preferably spaced upwardly from the floor a short distance, as indicaed at 12a (see FIG. 2), to provide an opening to facilitate cleaning the floor of the classroom containing the booth structure.

Each of the fixed side wall assemblies 11 is comprised of two spaced fixed side wall panels 15, 15a (see FIG. 5), each preferably formed of a perforated metal sheet 17, 17a, on the exposed face of the section and a metal sheet 18, 18a, on the opposite face, which sheet may be imperforate if desired, with rock wool or similar insulation material 16 disposed between the opposed metal sheets 17, 18, and 17a, 18a, respectively, the edges of the sections being closed. The side wall panels 15, 15a, are spaced laterally one from the other, sufficient to provide a receiving compartment therebetween for an extension member to be described hereinafter. A reinforcing channel member 19 (see FIGS. 2 and 4) is secured to the oppositely disposed metal sheets 18, 18a, on the inner surface of the lower longitudinal edge thereof. The vertical rearward edges of the side wall panels 15, 15a, are provided with an end cap member 20 which encloses the exposed vertical edge surfaces of the spaced wall panels 15, 15a, and the compartment therebetween. The inner surface 21 of the cap member 20 is secured to a vertically disposed rear guide post member 22 which extends upwardly from the floor a distance equal to about the height of the fixed side wall. A guide bar 23 is secured to the rear guide post member 22 on the forward edge thereof.

The forward edges of the side wall panels 15, 15a, each has a projecting flange portion 24, 24a, formed thereon which are fixedly secured to the adjacent fixed front wall assemblies 12. A plate member 25 (see FIGS. 4, 5 and 6) is secured to the lower forward edges of the spaced side wall panels 15, 15a, between the flanges 24, 24a, and extends upwardly from the floor a short distance properly spacing the said wall panels 15, 15a and maintaining the said sections joined in a unitary structure. The wall panels 15, 15a, are provided on each of the surfaces thereof facing the inside of the booth 10 with a support angle 26 which extends horizontally a short distance below the upper edge of the walls for supporting the desk surface means 13. If desired, however, the desk surface means 13 can be omitted altogether.

A vertically disposed front guide post 28 (see FIGS. 6 and 8) is secured to the plate member 25 through a spacer bar 29 and extends upwardly from the floor a distance substantially equal to the height of the fixed side and front wall assemblies 11, 12, respectively, as shown in FIG. 4. Mounted on the front surface of the guide post 28 and extending upwardly from the floor about one-third the height of the fixed wall assembly is a bumper stop plate 30 in the form of a channel, which coacts with a movable front extension section 31 to be described in detail hereinafter. Also mounted on each of the opposite lateral surfaces of the post 28 is a guide strip 32, 32a, respectively, which coacts with a movable side extension section 33.

The movable extension section 33 is reciprocably mounted in the fixed side wall assembly 11 in the compartment between the spaced wall panels 15, 15a, and is formed preferably of spaced perforated metal sheets 35, 35a, having a sound-insulation material 16 retained therebetween. The rearward vertical edge of the extension section 33 is provided with a slide channel member 37 which extends across the end edges of sheets 35, 35a, and provides a recess into which the guide bar 23 and vertical post member 22 extend. The upper horizontal edge of the section 33 is closed as at 34 and has secured thereto a pair of spaced lift handles 36. The forward vertical edge of the extension section 33 has a reinforcing channel member 38 disposed vertically along the inner vertical edge of the sheets 35, 35a. Mounted on the outer surface of the front vertical edge of the section 34 is a U-shaped channel guide means 39 which is disposed about the front post 28 and which slidably engages with the guide strips 32, 32a, respectively mounted on the post 28. Secured to each of the opposite outer lateral surfaces of the vertical channel guide means 39 is a slide spacer strip 40, 40a, respectively, each having a guide bar member 42, 42a, respectively, fastened to the lateral outer surface thereof which, by cooperating with a guide channel 69, 69a, respectively, on the side edges of the front extension section 31, serve as guide means for the front extension sections 31 and also provide a closed connection therebetween which prevents sound passing outwardly or inwardly between the said front and side extension sections.

The movable side extension section 33 is provided with a pair of spaced fastener means 44 adjacent the lower edge thereof for connection with a pair of spaced spring-loaded sash balances 46 of conventional form, through an interconnecting tape, for counterbalancing the weight of the extension section 33 to facilitate moving the section 33 upwardly to substantially increase the effective height of the fixed walls and also for positively limiting the upward movement of the extension section 33. The downward movement of the section 33 is limited at its rear edge by a top extension wall 49 (see FIG. 7) engaging the upper end of the rear end post 22 and at its front edge by the lower end of the channel guide means 39 engaging the upper edge of the bumper stop plate 30 mounted on the front post 28 (see FIG. 4).

The fixed front wall assemblies 12, which are rigidly connected with the fixed side wall assemblies 11, are formed of an inner perforated metal sheet 50 (see FIG. 7) and an outer imperforate metal sheet 51 spaced from the inner sheet 50 and having sound insulation material 16 therebetween. The sheets 50, 51, extend upwardly from a short distance above the supporting floor, to provide the opening 12a heretofore described, to the height of the fixed side walls 11. The upper edges of the sheets 50, 51, may be closed as at 52, and a bottom reinforcing angle member 54 connects the lower edges of the sheets 50, 51. The opposite vertically disposed lateral edges of the sheets 50, 51, are secured to the flanges 24, 24a, respectively, of the side wall assemblies 11.

The vertically movable front wall extension section 31 is reciprocably mounted on the front of the fixed wall assembly 12 and is formed of a perforated metal inner sheet 60 (see FIG. 7) and an imperforate metal outer sheet 61 spaced from the sheet 60 with sound-insulation material 16 therebetween. The top edge of the section 31 is closed as shown at 62, and a pair of lift handles 63 are mounted on the top edge 62 at spaced points thereon to facilitate raising and lowering the section 31. A bottom reinforcing channel member 64 which extends inwardly between the sheets 60, 61, and connects the inner lower edges thereof, has disposed therein a pair of spaced fastener hook means 65 for engagement by flexible tapes 67 of a pair of spaced spring-loaded sash balances 66 mounted in the fixed front wall section 12. The tapes 67 and sash balances 66 limit the upward movement of the front extension section 31. Extending across the outer face of the front lower edge of the front wall extension section 31 and securely fixed thereto is an angle stop member 68 which preferably extends slightly beyond the lower end of the extension section 31. The stop member 68 is adapted to about the bumper stop plates 30 at the respective ends thereof when the extension section 31 is moved downwardly, to limit positively the downward movement of the extension section 31.

The vertical side edges of the front wall extension section 31 are closed by a channel-shaped guide member 69, 69a, respectively, extending inwardly between the sheets 60, 61. The guide members 69, 69a, are adapted to cooperatively engage the lateral guide means 42, 42a respectively, which are associated with the said vertical guide means 39 on the side wall extension sections 33, and a closed slidable interconnection between the front wall extension section 31 and the adjacent side wall extension section 33. The latter arrangement provides the extension sections 31 and 33, respectively, with additional lateral guide support to maintain them in a vertical plane in any elevated position of adjustment and also provides a sound-insulating interconnection between the said extension sections so that the interior of each both is substantially acoustically isolated when the said extension sections are raised. If desired, however, separate guide means of any known design can be provided for the extension sections 33 and the front wall extension section 31 which are entirely independent of the said vertical guide means and lateral guide means described herein. And, in the latter embodiment, the interconnecting guide means 39, 42, and 69, and 39, 42a, and 69a, respectively, continue to serve the important function of providing sound-insulating closure means between the said side and front extension sections 31, 33, so that the interior of the booth is substantially acoustically isolated when the said extension sections are in an elevated position.

An enclosed trough or tubular member 70 (see FIG. 2) extends horizontally across the inner front wall sections 12 and is adapted to enclose the main trunk wires required for operating the various electrical and electronic apparatus used in each of the boths. A vertical tube 71 extends upwardly from the trough member 70 along the inner wall 12 to conduct the various wires from the trough member 70 upwardly to the desk surface 13 where the wires connect with the electronic apparatus 14 and a desk light 73 mounted on the front wall section 12.

In operation, when the students are working individually in the booths 10, the extension side wall sections 33 are raised upwardly by gripping the lift handles 36 and pulling upwardly until the sash balances 46 limit the movement of the sections 33. Similarly, the front wall extension section 31 is then raised by means of the front wall lift handle 63, the sash balances 66 limiting the upward movement. With the extension walls 31 and 33 in the fully elevated position, the audible sound traveling outwardly from the booth or inwardly from adjoining booths is substantially nil.

When group instruction is desired, the front extension walls 31 and the side extension walls 33 are lowered to the level of the fixed walls 11, 12, by applying downward pressure on the said extension sections until the said extension sections abut their respective lower stop elements described hereinbefore. With the extension sections in the "down" or lower position, there is no obstruction of the normal view of the front of the classroom from any portion of the room.

It will thus be evident that the present invention provides a novel arrangement of parts and improved means for interconnecting the movable side and front wall extension sections which provides both a sound-insulating connection and sturdy guide means for the extension sections and permits readily raising or lowering the said extension sections of a booth without employing vertically disposed guide posts extending above the fixed wall sections of the booth and obstructing the view of the students when the extension wall sections are in the "down" or lower position, and also acoustically isolates the interior of the booth when the said extension sections are in the "raised" or elevated position.

It should also be understood that while the booth structure of the present invention preferably has a desk surface mounted on at least one of the fixed walls within the booth, it is also contemplated that the present booth structure can be positioned about a desk which may not be permanently fixed to the walls of the booth. And, the present booth structure can be made as a single unit without being directly connected with any other booth or in any multiple of units, such as shown in FIGURE 1 of the drawing. In a preferred form of the invention, however, a plurality of booths are conveniently made as a unit which can be readily arranged in a classroom.

I claim:

1. A booth adapted to be mounted on a floor and of generally quadrilateral form having at least three sides and comprising spaced fixed vertical side walls and a fixed vertical front wall connected at each of the opposite ends thereof to the adjacent fixed side wall, an extension section mounted for vertical movement on each of the said fixed side walls and on the said fixed front wall, each of said fixed side walls having fixedly secured at the front end thereof stationary guide means spaced forwardly of said side wall and extending upwardly to about the height of said fixed side wall, each side wall extension section having movable guide means vertically disposed on the front end thereof in engagement with said stationary guide means, and lateral guide means disposed on at least one of the outer lateral surfaces of the movable guide means, and said front wall extension section having a guide member engaging said lateral guide means.

2. A booth according to claim 1 in which the said stationary guide means includes a vertical post adjacent the front end of each side wall, said post being secured to the side wall below said extension section mounted on the fixed side wall, and said movable guide means comprising a U-shaped guide extending about said post.

3. A booth adapted to be mounted on a floor and of generally quadrilateral form having at least three sides and comprising spaced fixed vertical side walls and a fixed vertical front wall connected at each of the opposite ends thereof to the adjacent fixed side wall, an extension section mounted for vertical movement on each of the said fixed side walls and on the said fixed front wall, each of said fixed side walls having fixedly secured at the front and rear ends thereof front and rear stationary guide means, said front stationary guide means spaced forwardly of said side wall and extending upwardly to about the height of said fixed side wall, each side wall extension section having front movable guide means vertically disposed on the front end thereof and extending substantially the length thereof in engagement with said front stationary guide means, and a lateral guide means disposed on at least one of the outer lateral surfaces of the said front movable guide means, said lateral guide means engaging a mating guide member mounted on the front wall extension section to maintain said front wall extension section in substantially a vertical plane in any position of adjustment without employing a vertical post member extending above the height of the said fixed walls.

4. A booth adapted to be mounted on a floor and of generally quadrilateral form having at least three sides comprising spaced fixed vertical side walls and a fixed vertical front wall with the said front wall having a closed interconnection with the adjacent fixed side walls, an extension section reciprocably mounted on each of the said fixed side walls and on the said fixed front wall, each of said fixed side walls having fixedly secured at the front end thereof stationary guide means spaced forwardly of said front end and extending upwardly substantially to the height of said fixed side wall, each of said side wall extension sections having movable guide means vertically disposed adjacent the front end thereof and extending outwardly therefrom engaging said stationary guide means adjacent thereto, said movable guide means having lateral guide means disposed vertically along the opposite outer lateral surfaces thereof substantially in the plane of a front extension section, and said front extension section having a guide member disposed on each vertically extending end thereof in engagement with said lateral guide means to form a closed interconnection with the adjacent side wall extension sections, the opposite lateral surface of each said lateral guide means being engageable by a front extension section of an adjoining booth; whereby the extension sections are slidably interconnected and maintained in a substantially vertical plane in any position of adjustment and effect substantial acoustical isolation of the interior of the said booth when the extension sections are raised.

5. A multiple unit booth structure adapted to be mounted on a supporting floor and of a generally quadrilateral form and comprising at least three spaced vertical sound-deadening fixed side walls and a pair of fixed front walls forming closed interconnections with adjacent fixed side walls to provide a pair of booth units, said fixed walls extending upwardly to a predetermined height, an extension wall section of sound-deadening material reciprocably mounted on each of said fixed walls for varying the effective height of said fixed walls to a height substantially above said predetermined height, each of said extension wall sections being movable independently of every other said extension wall section, a stationary guide means supported by each of said fixed side walls and extending upwardly not substantially above the height of said fixed walls, each of said extension wall sections having secured thereto vertically disposed guide means movable therewith and extending the length thereof, each of said movable guide means of a side extension wall section being in engagement with one of said stationary guide means and maintaining said side extension wall section in a vertical plane in any position of adjustment, movable guide means on a said front extension wall section of one booth unit in sliding interlocking engagement with said movable guide means of one of said side extension wall sections in at least one position of reciprocable adjustment, and movable guide means on a front wall of another of said booth units in sliding interlocking engagement with said movable guide means of said one side extension wall section in at least one position of reciprocable adjustment; whereby said extension wall sections in elevated position form an interconnecting sound-deadening booth structure.

6. A multiple unit booth structure adapted to be mounted on a floor with each booth unit of generally quadrilateral form and comprising at least three spaced vertical fixed side walls and a vertical fixed front wall connecting the adjacent fixed side walls, an extension wall section reciprocably mounted for vertical movement on each of the said fixed walls, at least one of said fixed walls having a stationary guide means fixedly secured thereto, said stationary guide means spaced from said fixed walls and extending upwardly substantially to the height of said fixed walls, at least one of said extension wall sections having a movable guide means vertically disposed thereon adjacent one end thereof which engages said stationary guide means, at least one of said movable guide means having lateral guide means disposed vertically on two lateral surfaces thereof substantially in the vertical plane of the front extension wall sections of said booth units, and a front extension wall section of a first booth unit having a guide member disposed on each end thereof, one said guide member being in engagement with one of said lateral guide means of an adjacent side extension wall section effecting a closed sliding interconnection therewith, the other of said lateral guide means disposed on the opposite lateral surface of said movable guide means being in independent sliding interconnection with a guide member secured to an end of a front extension wall section of a second booth unit; whereby the extension wall sections are slidably interconnected and maintained in a substantially vertical plane in any position of adjustment and effecting substantial acoustical isolation of the interior of the said booth when said extension wall sections are in elevated position.

References Cited in the file of this patent

UNITED STATES PATENTS

| 1,992,903 | Potashnik | Feb. 26, 1935 |
| 2,673,132 | Alderman | Mar. 23, 1954 |
| 2,944,861 | Lessin | July 12, 1960 |

FOREIGN PATENTS

| 410,940 | Germany | Mar. 23, 1925 |